(12) United States Patent
Thai et al.

(10) Patent No.: US 8,175,238 B2
(45) Date of Patent: May 8, 2012

(54) SYSTEM AND METHOD OF PROVIDING NUMBER IDENTIFICATION IN AN INTELLIGENT TELEPHONE NETWORK

(75) Inventors: Tuan Thai, Oakland, CA (US);
Elizabeth Smith, San Diego, CA (US);
Dimitris Karagiannis, Alamo, CA (US);
Anup D. Karnalker, Allen, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 12/622,512

(22) Filed: Nov. 20, 2009

(65) Prior Publication Data

US 2010/0067676 A1  Mar. 18, 2010

Related U.S. Application Data

(63) Continuation of application No. 11/092,966, filed on Mar. 29, 2005, now Pat. No. 7,623,639.

(51) Int. Cl.
*H04M 1/56* (2006.01)
*H04M 15/06* (2006.01)

(52) U.S. Cl. ......... 379/142.04; 379/142.02; 379/142.09; 379/142.14

(58) Field of Classification Search ............ 379/142.01, 379/142.02, 142.03, 142.04, 142.1, 142.17, 379/245, 247, 142.24, 142.09, 142.14
See application file for complete search history.

(56) References Cited

U.S. PATENT DOCUMENTS

| | | | |
|---|---|---|---|
| 5,799,073 A | 8/1998 | Fleischer, III et al. | |
| 5,901,209 A * | 5/1999 | Tannenbaum et al. ... | 379/142.09 |
| 6,748,068 B1 | 6/2004 | Walsh et al. | |
| 6,766,003 B2 | 7/2004 | Moss et al. | |
| 6,771,754 B2 | 8/2004 | Pelletier et al. | |
| 7,499,536 B2 * | 3/2009 | Boeckman et al. ...... | 379/210.01 |
| 2003/0215078 A1 * | 11/2003 | Brahm et al. ............ | 379/211.02 |
| 2005/0043066 A1 | 2/2005 | Seo | |
| 2005/0044243 A1 | 2/2005 | Narayanan et al. | |
| 2005/0259804 A1 * | 11/2005 | Bedingfield ............ | 379/211.02 |
| 2007/0121855 A1 | 5/2007 | Tiliks et al. | |
| 2010/0054432 A1 * | 3/2010 | Brahm et al. ............ | 379/88.19 |
| 2010/0142693 A1 * | 6/2010 | Bedingfield ............ | 379/201.11 |

* cited by examiner

*Primary Examiner* — Binh Tieu
(74) *Attorney, Agent, or Firm* — Toler Law Group, PC

(57) ABSTRACT

In a particular embodiment, a method of managing calls to a toll-free telephone number is disclosed. The method includes modifying a calling party identification (ID) privacy indicator associated with a received telephone call directed to a toll-free number. The calling party ID privacy indicator is modified based at least in part on a day that the telephone call is received.

20 Claims, 4 Drawing Sheets

SYSTEM AND METHOD OF PROVIDING NUMBER IDENTIFICATION IN AN INTELLIGENT TELEPHONE NETWORK

CLAIM OF PRIORITY

The present application claims priority from and is a continuation of patent application Ser. No. 11/092,966 filed on Mar. 29, 2005 and entitled "System and Method of Providing Number Identification in an Intelligent Telephone Network," the contents of which are expressly incorporated herein by reference in their entirety.

FIELD OF THE DISCLOSURE

The present disclosure relates generally to telephone caller identification services.

BACKGROUND

Caller identification is a telephone service that permits the recipient of an incoming call to determine the number from which the incoming call is being placed before the call is answered. Typically, the caller identification information, e.g., the caller's name and telephone number, are displayed at the recipient's telephone or another device attached to the telephone line. Caller identification is a service that is usually purchased by telephone subscribers in order to identify incoming calls.

Caller identification restriction, on the other hand, is a service that enables a caller to prevent his or her telephone number from being displayed at a recipient device. Caller identification restriction is typically a feature that is purchased by telephone subscribers in order to prevent their telephone numbers from being publicized as telephone calls are made.

Businesses have a great interest in collecting telephone numbers. Telephone numbers can be collected each time someone calls a toll-free number. The collected telephone numbers and the demographic information that can be compiled based on the collected telephone numbers are important to marketers when trying to reach particular target markets. Collecting telephone numbers can be quite easy using caller identification services, unless a caller subscribes to a caller identification restriction service. In the case of a caller with caller identification restriction, the holder of the toll-free number may be unable to obtain the telephone number of the person calling the toll free number.

Accordingly, there is a need for an improved system and method for providing caller identification privacy override.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

In a particular embodiment, a method of managing calls to a toll-free telephone number is disclosed. The method includes modifying a calling party identification (ID) privacy indicator associated with a received telephone call directed to a toll-free number. The calling party ID privacy indicator is modified based at least in part on a day that the telephone call is received.

In another embodiment, a method of modifying a calling party identification (ID) privacy indicator is disclosed. The method includes receiving a signaling system 7 (SS7) query message associated with a telephone call made to a toll-free telephone number. The method also includes selectively permitting an identification of a caller based on a caller identification privacy override (CPO) input by modifying a parameter in a response message to the SS7 query message. The modification is based at least in part on a day that the telephone call is made.

In another embodiment, a computer readable medium storing processor-executable instructions is disclosed. When executed by a processor, the processor-executable instructions cause the processor to modify a calling party ID privacy indicator within a query message associated with a received telephone call directed to a toll-free number. The modification is based at least in part on a day that the telephone call is received.

Figure 1:
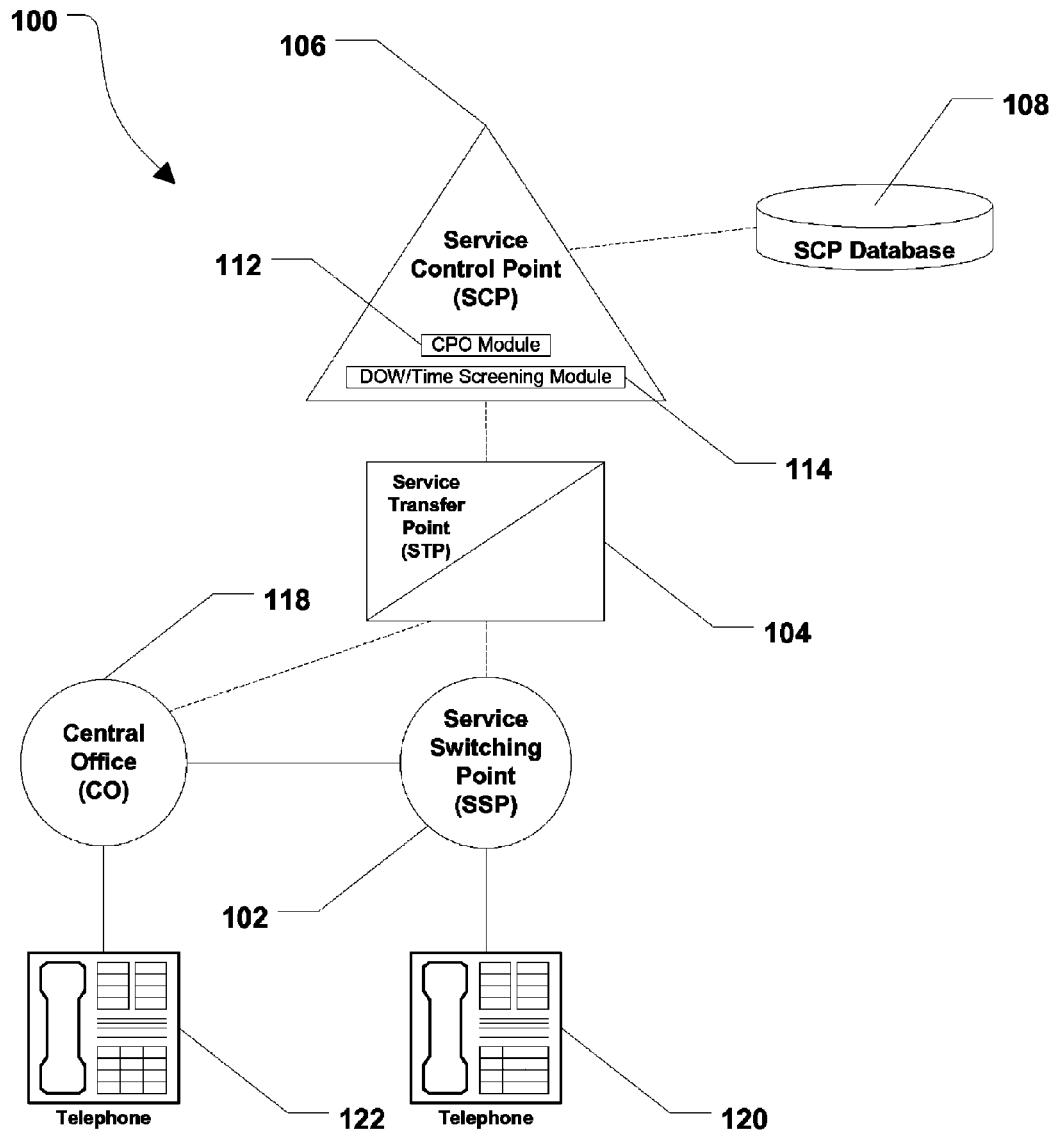
FIG. 1 is a diagram of an exemplary telephone system.

Referring initially to FIG. 1, an exemplary, non-limiting embodiment of a telecommunications system is illustrated and is generally designated 100. As depicted in FIG. 1, the system 100 includes a service switching point (SSP) 102 to which a signal transfer point (STP) 104 is connected and communicates therewith. In a particular embodiment, a service control point (SCP) 106 is connected to the STP 104. Moreover, an SCP database 108 is connected to the SCP 106. As shown in FIG. 1, the SCP 106 can include a Caller ID privacy override (CPO) module 112 and a day-of-week (DOW) time screening module 114.

In a particular embodiment, information related to the called party can reside within the SCP database 108. Further, in a particular embodiment, the CPO module 112 can allow the SCP 106 to override a Calling Party ID privacy indicator associated with a calling party's telephone number when the called party subscribes to a CPO service and has the CPO service set to enable. Also, the DOW/time screening module 114 can determine the day of the week that a particular telephone call is made and the time of day that the telephone call is made. As such, a subscriber to the CPO service can choose to override Calling Party ID privacy indicators only on weekdays and only during regular business hours. In the case that the owner of a particular toll-free number is charged on a per call basis for the CPO service, this time and day selection feature can prevent the owner from being charged for calls that are not received when someone is present to view caller identification information.

FIG. 1 further shows a central office (CO) 118 that is connected to the SSP 102. Additionally, a representative called telephone station 120 is connected to the SSP 102 and a representative calling telephone station 122 is connected to the CO 118. In an exemplary embodiment, the system 100 shown in FIG. 1 can further include intelligent network system components, commonly referred to as advanced intelligent network (AIN) components, that are suitable for implementing one or more of the logic steps described below. The AIN components are commercially available from several vendors and can be used to implement computer program code.

Specifically, in a particular embodiment, the SSP 102 can include an AIN switch that routes calls, recognizes and responds to triggers, generates queries to obtain call information and responds to returned call information. The SSP 102 can connect the called telephone station 120 with the CO 118 in order to enable communication between called telephone station 120 and calling telephone station 122. Moreover, in a particular embodiment, the SSP 102 communicates with the SCP 106 and the CO 118 by utilizing the signaling protocol Signaling System 7 (SS7). In an illustrative embodiment, the SSP 102 and the SCP 106 communicate using transaction capabilities applications protocol (TCAP).

In a particular embodiment, the SSP 102 generates query messages to the SCP 106 and receives and responds to responses to the response messages returned from the SCP 106. Using the SS7 protocol a query message can be an Info_Collected message or an Info_Analyzed message. Also, a response message can be an Analyze_Route message. Further, the query message can include a Calling Party ID that can include one or more parameters such as a Calling Party ID digits field, a Calling Party ID privacy indicator, a Calling Party ID nature of address field, a Calling Party ID numbering plan field, and a Calling Party screening indicator. The query message can also include a Charge Number that can include one or more parameters such as a Charge Number digits field, a Charge Number nature of address, and a Charge Number numbering plan. In an exemplary embodiment, the CPO module 112 can modify one or more of those parameters and include the modified or unmodified parameters in a response message that is generated in response to the query message.

In a particular embodiment, the Calling Party ID digits field can include the telephone address of the calling party. Further, the Calling Party ID privacy indicator is an indication of whether the identity of the calling party should be disclosed to a called party. For example, a value of 00 would indicate that the identity of the calling party can be disclosed and a value of 01 would indicate that the identity of the calling party cannot be disclosed. The Calling Party ID nature of address field indicates whether an address, e.g., the calling party address, is for national use, international user, or other use.

Also, in a particular embodiment, the Calling Party ID numbering plan field indicates to which plan the address belongs, such as a plan for the public switched telephone network (e.g., plan E.164), a plan for the mobile telephones network (e.g., plan E.212), a private numbering plan, or an Internet numbering plan. The Calling Party screening indicator field indicates the source of the calling party ID information which may be provided by the source local network for the call or from the calling subscriber. In a particular embodiment, the Charge Number can include the automatic number identification (ANI) of the calling party for billing purposes.

In an illustrative embodiment, the STP 104 can include a network element that transfers signaling communications in response to SS7 messages. The STP 104 transfers queries from the SSP 102 to the SCP 106 and transfers responses to the queries from SCP 106 to SSP 102. Further, the SCP 106 includes an AIN element that can store call information and can receive and respond to queries. In a particular embodiment, the SCP 106 can store call control information in the SCP database 108 and can access the stored call control information.

Also, in a particular embodiment, the SCP 106 can store standard caller identification information in the SCP database 108 and can access the stored caller identification information. When telephone calls are made, the SCP 106 receives queries generated by the SSP 102 and responds to the queries by performing database searches to locate the requested call control information or caller identification information. The SCP 106 can forward the call control information or caller identification information to SSP 102.

Figure 2:
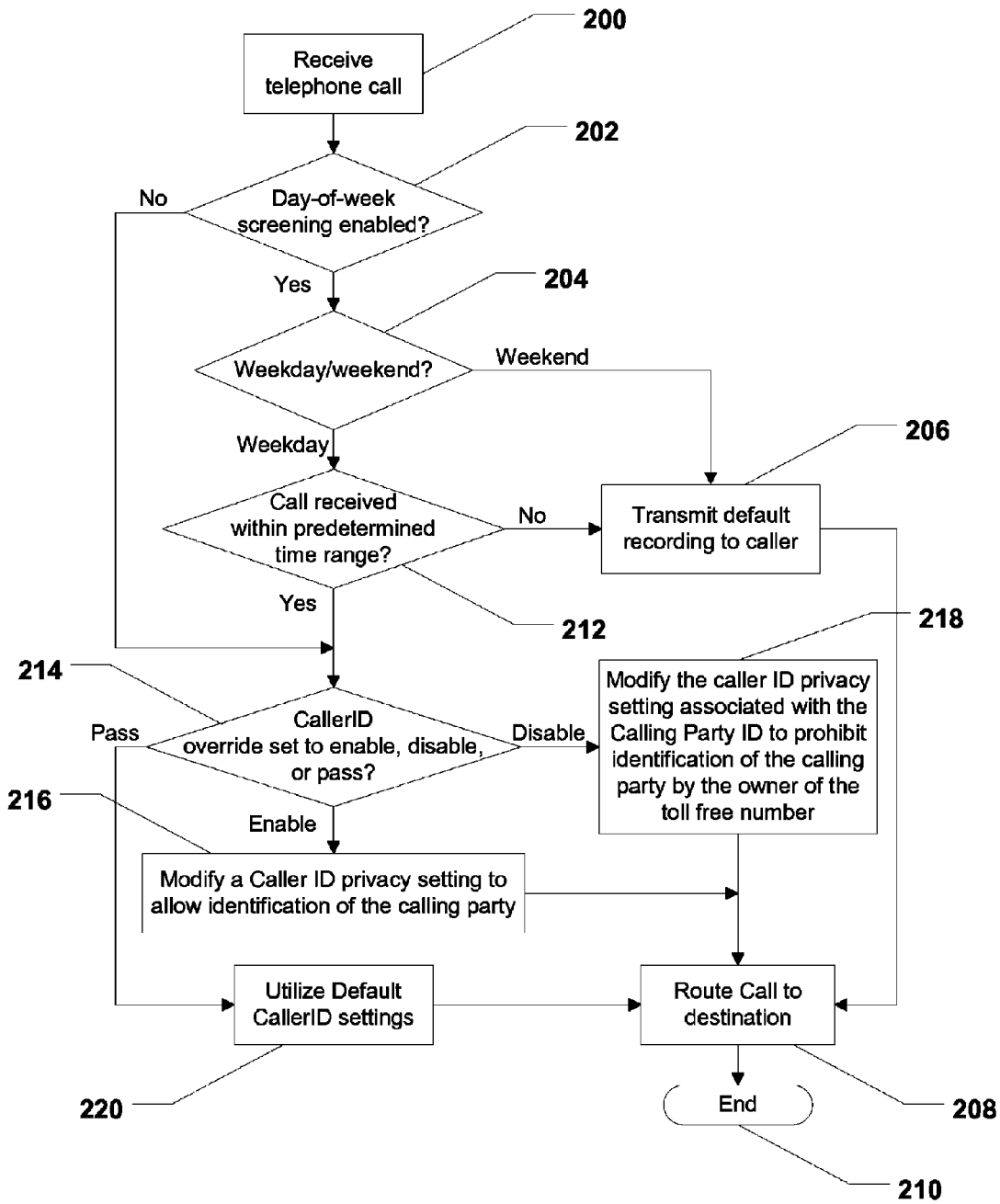
FIG. 2 is a flow chart to illustrate a general method for overriding telephone Calling Party ID privacy indicators.

FIG. 2 shows a method of managing telephone calls to a toll-free number. Commencing at block 200, the service control point (SCP) receives a telephone call to a toll-free number. At block 202, the SCP determines if day-of-week screening is enabled for the owner of the toll-free number called. In a particular embodiment, the DOW/time screening module within the SCP determines whether the day-of-week screening is enabled.

If the day-of-week screening is enabled, the method proceeds to block 204 and the SCP determines if the telephone call is made on a weekday or a weekend. If the call is made on a weekend, a default recording can be transmitted to the caller at block 206. In a particular embodiment, the default recording can indicate that the owner of the toll-free number is currently not open for business and that the caller will be forwarded to an answering service, e.g., a human answering service or an automated answering service. At block 208, the call is routed to the destination, i.e., the answering service. The method then ends at state 210.

Returning to decision step 204, if the call is received on a weekday, the method continues to decision step 212. At decision step 212, the SCP determines whether the call is received within a predetermined time range. In a particular embodiment, the DOW/time screening module within the SCP determines the time when the call is received and whether that time is within a predetermined time range. Particularly, the predetermined time range is a time range associated with a normal business day, e.g., from 7:00 AM to 7:00 PM.

If the call is not received within the predetermined time range, the method moves to block 206 and continues as described above. Conversely, if the call is received within the predetermined time range, the method proceeds to decision step 214 and the SCP determines whether a Caller ID override service for the toll-free number is set to enable, disable, or pass. In a particular embodiment, the CPO module within the SCP determines the status of the Caller ID override service for the owner of the toll-free number.

If the Caller ID override service is enabled, the method proceeds to block 216 and the CPO module within the SCP modifies the Calling Party ID privacy indicator associated with the Calling Party ID to allow identification of the calling party by the owner of the toll-free number. For example, if the Calling Party ID privacy indicator is a Calling Party ID privacy indicator that is set to 01, it will be reset to 00 to indicate that the identity of the calling party can be disclosed to the called party. Next, the method moves to block 208 and the SCP routes the call to the final destination, e.g., an agent of the owner of the toll-free number. The logic then ends at state 210.

At decision step 214, if the Caller ID override service is disabled, the method proceeds to block 218 and the CPO module within the SCP modifies the Calling Party ID privacy indicator associated with the Calling Party ID to not allow identification of the calling party by the owner of the toll-free number. For example, if the Calling Party ID privacy indicator is a Calling Party ID privacy indicator that is set to 00, it will be reset to 01 to indicate that the identity of the calling party cannot be disclosed to the called party. The method then proceeds to block 208 and continues as described above. If the Caller ID override service is set to pass, the method moves to block 220 and the SCP utilizes the default Caller ID settings, e.g., the settings selected by the caller when establishing his or her telephone services. Thereafter, the logic continues to block 208 and the SCP routes the call to the destination. The logic then ends at state 210.

Figure 3:
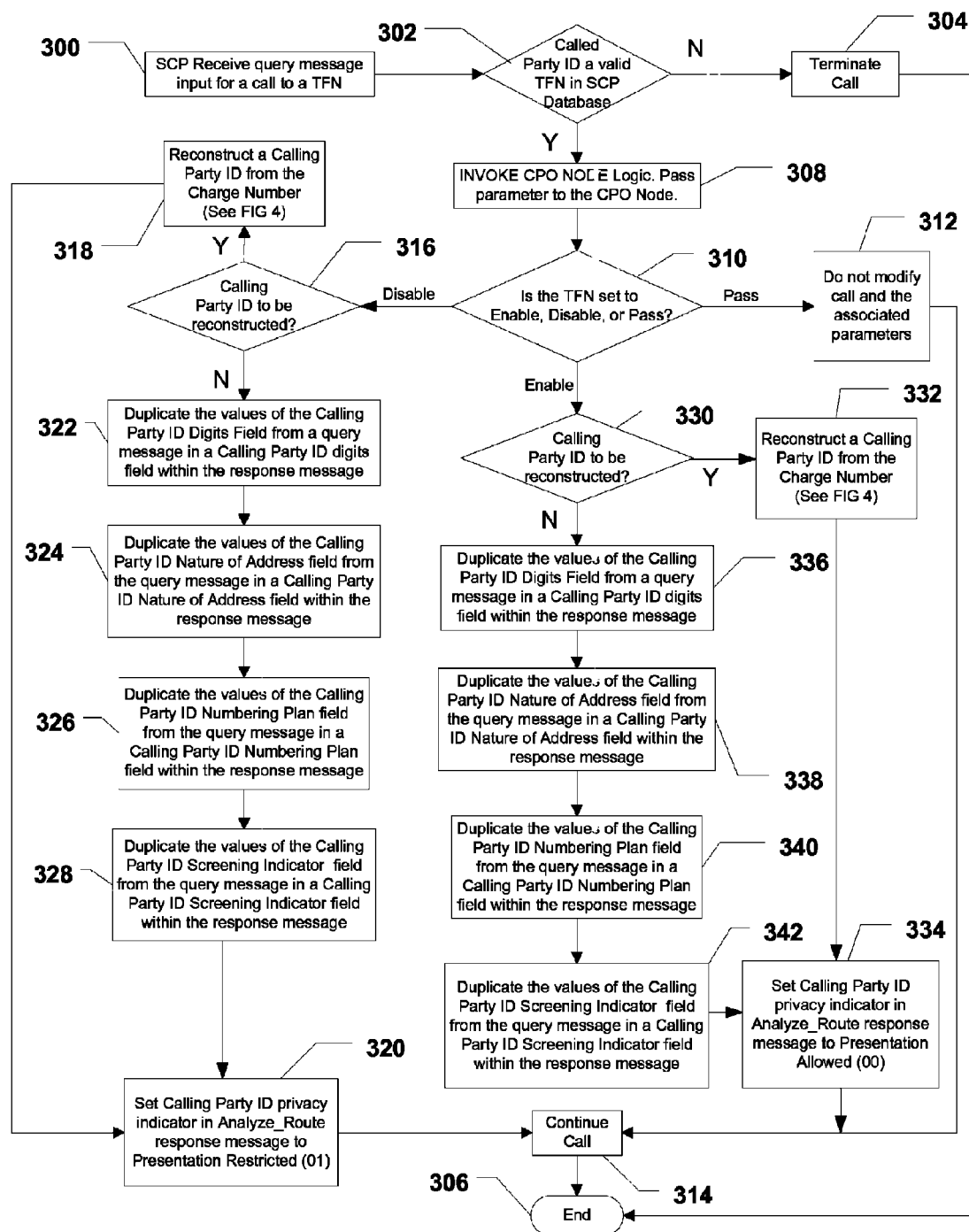
FIG. 3 is a flow chart to illustrate a detailed method for overriding telephone Calling Party ID privacy indicators.

Referring to FIG. 3, a method for overriding caller identification settings is illustrated and commences at block 300 when a Service Control Point (SCP) receives a query message input for a call to a toll-free number. At decision step 302, the SCP examines the query message and determines whether the Called Number is a toll-free number that exists within the SCP database. If it does not, the method proceeds to block 304 and the SCP terminates the call. The method then ends at state 306.

Returning to decision step 302, if the toll-free number exists within the SCP database, the method continues to block 308. At block 308, the SCP invokes the CPO module logic and the SCP passes one or parameters to the CPO module in order to modify a Calling Party ID privacy indicator associated with the calling party.

Proceeding to decision step 310, the CPO module determines whether the toll-free number presented as Called Number in the SS7 message input received at the SCP has a Caller ID service setting set to enable, disable, or pass. In a particular embodiment, the CPO module makes this determination by communicating with the SCP database. When the SCP database indicates that the Caller ID service setting for the Toll-free number is pass, the method continues to block 312 and the CPO module does not modify the call and its associated parameters. Thereafter, the method proceeds to block 314 and the call continues. The method then ends at state 306.

Figure 4:
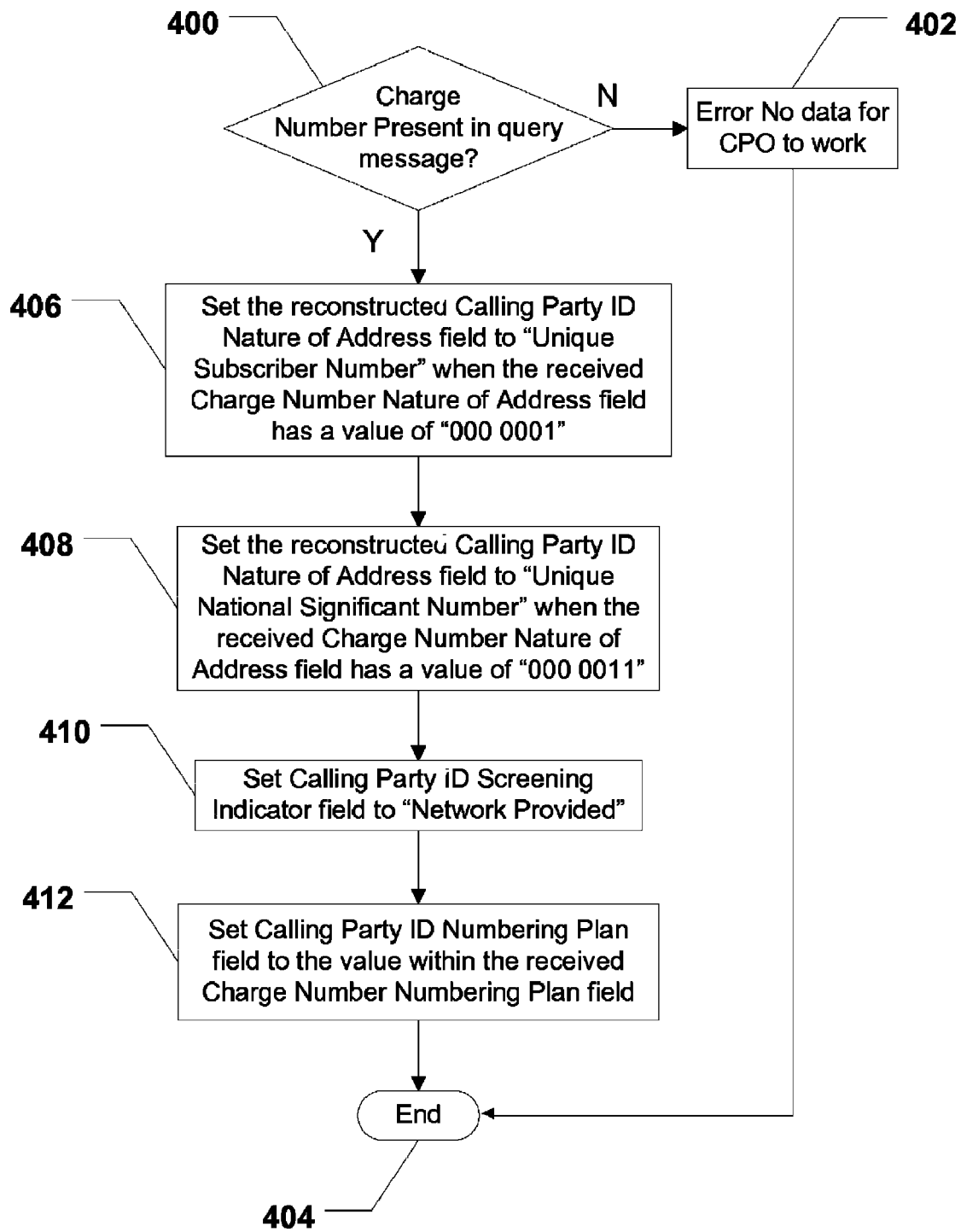
FIG. 4 is a flow chart to illustrate a method of reconstructing a Calling Party ID from a Charge Number.

Returning to decision step 310, when the Caller ID service setting for the toll-free number is disable, the method proceeds to decision step 316 and the CPO module determines whether the Calling party ID needs to be reconstructed. If so, the method continues to block 318 and the Calling Party ID is reconstructed from a Charge Number. FIG. 4 depicts an exemplary, non-limiting embodiment of a method of reconstructing the Calling Party ID from the Charge Number. From block 318, the method then proceeds to block 320 and the CPO module sets the Calling Party ID privacy indicator in a Analyze_Route response message of the SCP to Presentation Restricted, e.g., to a value of 01. Thereafter, the method proceeds to block 314 and the call continues. The method then ends at state 306.

Returning to decision step 316, if the Calling party ID does not need to be reconstructed, CPO module copies the values of the Calling Party ID from the received SS7 message. In a particular embodiment, at block 322 the CPO module duplicates the values of the Calling Party ID digits field from the query message in a Calling Party ID digits field within the response message. Next, at block 324, the CPO module duplicates the values of the Calling Party ID nature of address field from the query message in a Calling Party ID nature of address field within the response message.

Moving to block 326, the CPO module duplicates the values of the Calling Party ID numbering plan field from the query message in a Calling Party ID numbering plan field within the response message. At block 328, the CPO module duplicates the values of the Calling Party ID screening indicator field from the query message in a Calling Party ID screening indicator field within the response message. Then, at block 320, the CPO module sets the Calling Party ID privacy indicator in an Analyze_Route response message of the SCP to Presentation Restricted, e.g., to a value of 01. The method then continues to block 314 and the call continues. The method then ends at state 306.

Returning to decision step 310, if the Caller ID service setting for the toll-free number is enable, the method proceeds to decision step 330 and the CPO module determines whether the Calling party ID needs to be reconstructed. If so, the method moves to block 332, and the Calling Party ID is reconstructed from a Charge Number, as described in detail in conjunction with FIG. 4. Next, at block 334, the CPO module sets the Calling Party ID privacy indicator in an Analyze_Route response message of the SCP to presentation allowed, e.g., to a value of 00. Thereafter, the method proceeds to block 314 and the call continues. The method then ends at state 306.

Returning to decision step 330, if the Calling party ID does not need to be reconstructed, the CPO module copies the values of the Calling Party ID from the received SS7 message. For example, at block 336 the CPO module duplicates the values of the Calling Party ID digits field from the query message in a Calling Party ID digits field within the response message. Next, at block 338, the CPO module duplicates the values of the Calling Party ID nature of address field from the query message in a Calling Party ID nature of address field within the response message.

Moving to block 340, the CPO module duplicates the values of the Calling Party ID numbering plan field from the query message in a Calling Party ID numbering plan field within the response message. At block 342, the CPO module duplicates the values of the Calling Party ID screening indicator field from the query message in a Calling Party ID screening indicator field within the response message. Continuing to block 334, the CPO module sets the Calling Party ID privacy indicator in an Analyze_Route response message of the SCP to Presentation Allowed, e.g., to a value of 00. Thereafter, the method proceeds to block 314 and the call continues. The method then ends at state 306.

Referring to FIG. 4, a method of reconstructing a Calling Party ID from a Charge Number is shown and commences at decision step 400. At decision step 400, the CPO module determines whether the Charge Number is present in the query message. If not, the method moves to block 402 and an error is returned indicating that no data is available for the CPO module. The method then ends at state 404.

Returning to decision step 400, if the Charge Number is present in the query message, the method continues to block 406 and the CPO module sets a reconstructed Calling Party ID Nature of Address field to "Unique Subscriber Number" when the received Charge Number Nature of Address field has a value of "000 0001." At block 408, the CPO module sets the reconstructed Calling Party ID Nature of Address field to "Unique National Significant Number" when the received Charge Number Nature of Address field has a value of "000 0011." Continuing to block 410, the CPO module sets the Calling Party ID Screening Indicator field to "Network Provided." At block 412, the CPO module sets the Calling Party ID Numbering Plan field to the value within the received Charge Number Numbering Plan field. The method then ends at state 404.

With the configuration of structure described above, the system and method of providing automatic number identification delivery service in an intelligent telephone network allows the recipient of telephone calls from callers that have blocked their caller identification information to override the privacy setting and unblock the caller identification information. A company can subscribe to a caller identification privacy override service and privacy settings can be overridden on weekdays only or within predefined time periods on weekdays, e.g., during normal business hours. As such, the subscriber will not be charged for calls received outside of normal business hours in which privacy settings have been overridden.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing calls to a toll free telephone number, the method comprising:
modifying a calling party identification privacy indicator associated with a received telephone call directed to a toll-free number, wherein the calling party identification privacy indicator is modified based at least in part on a day that the telephone call is received.

2. The method of claim 1, wherein a caller identification is determined after the calling party identification privacy indicator is modified.

3. The method of claim 1, wherein the calling party identification privacy indicator is modified only when the day is a weekday.

4. The method of claim 1, wherein the calling party identification privacy indicator is modified only when the telephone call is received within a predetermined time range.

5. The method of claim 1, wherein the modifying comprises modifying the calling party identification privacy indicator only when a caller identification service setting associated with the toll-free number is set to enable or to disable.

6. The method of claim 1, wherein the modifying comprises modifying the calling party identification privacy indicator when a caller identification service setting associated with the toll-free number is set to enable or to disable and refraining from modifying the calling party identification privacy indicator when the caller identification service setting associated with the toll-free number is set to pass.

7. A method of modifying a calling party identification privacy indicator, the method comprising:
receiving a signaling system seven query message associated with a telephone call made to a toll-free telephone number; and
selectively permitting an identification of a caller based on a caller identification privacy override input by modifying at least one parameter in a response message to the signaling system seven query message, wherein the at least one parameter is modified based at least in part on a day that the telephone call is made.

8. The method of claim 7, wherein the at least one parameter includes a calling party identification privacy indicator.

9. The method of claim 7, wherein the at least one parameter includes a calling party identification digits field.

10. The method of claim 7, wherein the at least one parameter includes a calling party identification nature of address field.

11. The method of claim 7, wherein the at least one parameter includes a calling party identification numbering plan field.

12. The method of claim 7, wherein the at least one parameter includes a calling party identification screening indicator.

13. The method of claim 7, wherein the at least one parameter includes a charge number parameter.

14. The method of claim 13, wherein the charge number parameter comprises at least one of a charge number digits field, a charge number nature of address field, and a charge number numbering plan field.

15. The method of claim 8, further comprising:
setting the calling party identification privacy indicator to a presentation restricted value when the caller identification privacy override input is disable;
setting the calling party identification privacy indicator to a presentation allowed value when the caller identification privacy override input is enable; and
maintaining a current value of the calling party identification privacy indicator when the caller identification privacy override input is pass.

16. The method of claim 7, further comprising:
when the caller identification privacy override input is disable or enable, determining whether a calling party identification needs to be reconstructed;
when the calling party identification needs to be reconstructed, reconstructing the calling party identification from a charge number within the signaling system seven query message.

17. The method of claim 16, further comprising, after reconstructing the calling party identification:
when the caller identification privacy override input is disable, setting the calling party identification privacy indicator to presentation restricted; and
when the caller identification privacy override input is enable, setting the calling party identification privacy indicator to presentation allowed.

18. A non-transitory computer readable medium storing processor-executable instructions that, when executed by a processor, cause the processor to:
modify a calling party identification privacy indicator within a query message associated with a received telephone call directed to a toll-free number, wherein the calling party identification privacy indicator is modified based at least in part on a day that the telephone call is received.

19. The computer readable medium of claim 18, wherein the calling party identification privacy indicator is modified only when the day is a weekday.

20. The computer readable medium of claim 18, further comprising processor-executable instructions to override the calling party identification privacy indicator only when the telephone call to the toll-free number is completed within a predetermined time range.

* * * * *